Jan. 29, 1963
R. A. HEDLER ETAL
3,075,870
CATHODE RAY TUBE SHIELD
Filed Dec. 21, 1959
2 Sheets-Sheet 1
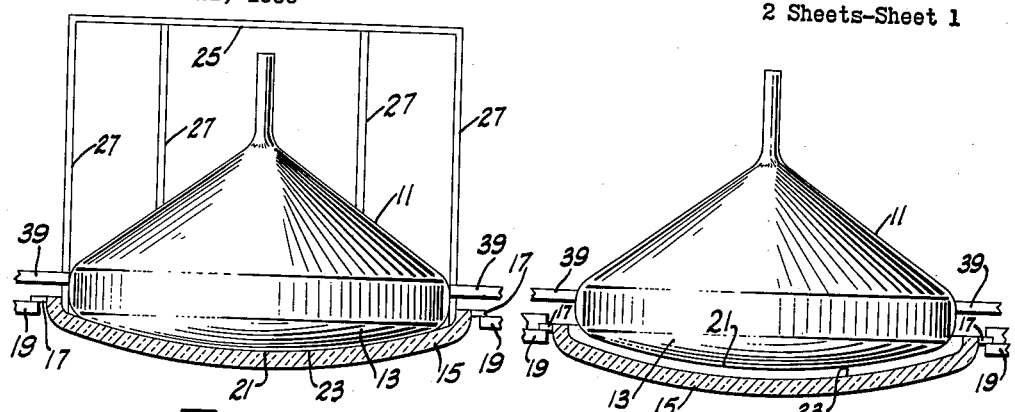
Fig. 1
Fig. 3
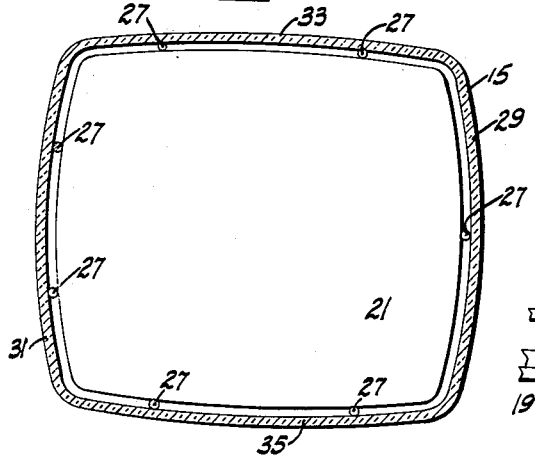
Fig. 2
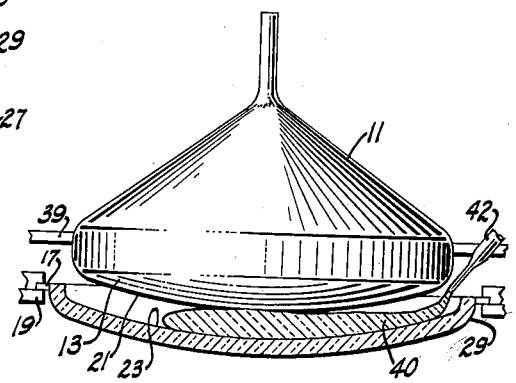
Fig. 4
Fig. 6
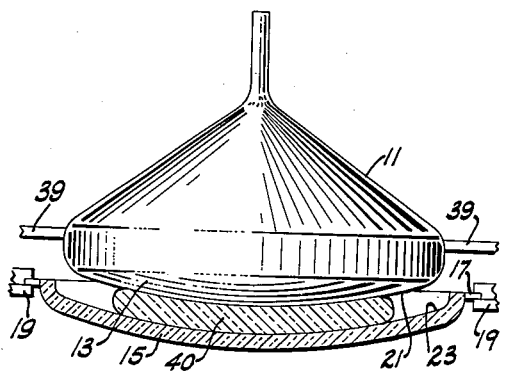
Fig. 5
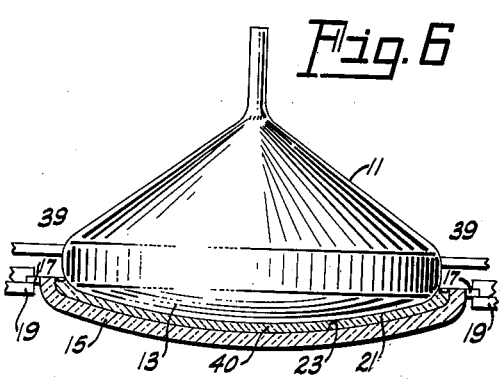
INVENTORS
Robert A. Hedler, John F. Larson &
John W. Stetz
BY
Norman J. O'Malley
ATTORNEY Jan. 29, 1963 R. A. HEDLER ETAL 3,075,870
CATHODE RAY TUBE SHIELD
Filed Dec. 21, 1959 2 Sheets-Sheet 2

INVENTORS
Robert A. Hedler, John F. Larson &
John W. Stetz
BY
Norman J. O'Malley
ATTORNEY

United States Patent Office 3,075,870
Patented Jan. 29, 1963

3,075,870
CATHODE RAY TUBE SHIELD
Robert A. Hedler and John F. Larson, Seneca Falls, and John W. Stetz, Waterloo, N.Y., assignors to Sylvania Electric Products Inc., a corporation of Delaware
Filed Dec. 21, 1959, Ser. No. 860,975
4 Claims. (Cl. 156—295)

This invention relates generally to laminations of glass on glass and more specifically to the lamination or bonding of a glass safety shield on the faceplate portion of a cathode ray tube type image display.

Cathode ray tube faceplate shields of the prior art generally comprise a cabinet-supported sheet of either laminated safety glass or tempered glass positioned in front of the cathode ray tube and separately supported. Such shields must be removably mounted for cleaning thereby placing limitations on cabinet design in many respects. Also, problems involving reflected ambient light which reduces apparent contrast lead many manufacturers to tilt the shield or use light polarizing material in the shields. These costly solutions left room for improvement.

Other concepts have been suggested such as dipping or flowing a light permeable plastic coating over the faceplate of the cathode ray tube; however, few if any coating techniques for such plastic have been found suitable for use in mass production.

Prior work has also been done in laminating a glass safety shield directly to the faceplate of the cathode ray tube to arrive at a final structure somewhat similar to the structure shown herein. However, prior processes used for fabricating the bonded shield type cathode ray tube are not suitable for efficient mass production. Thus, it is an object of this invention to provide a laminating or bonding process suitable for efficient mass production.

It is also an object of this invention to provide a lamination process which can be carried out with relatively small manufacturing shrinkage.

It is still a further object of this invention to provide a lamination process which requires a minimum of cathode ray tube handling equipment to provide a high degree of precision and a suitable end product.

Basically, the invention in one aspect comprises a process which involves adjusting the lamination spacing, between a safety shield containing the final quantity of bonding medium in fluid form and a cathode ray tube faceplate, by moving the safety shield from an enlarged spacing to a spacing which forces the bonding medium to wet the entire lamination surface of the safety shield, wherein said enlarged spacing is greater than the final lamination spacing and less than the spacing which would allow only minimum wetting of the faceplate.

For a better understanding of the present invention, together wtih other and further objects, advantages and capabilities thereof, reference is made to the following disclosure and appended claims in connection with the accompanying drawings in which:

FIG. 1 shows, in representative form, clamping and side spacing structures; and

FIG. 2 shows, in representative form, a bottom view of FIG. 1; and

Figure 7:
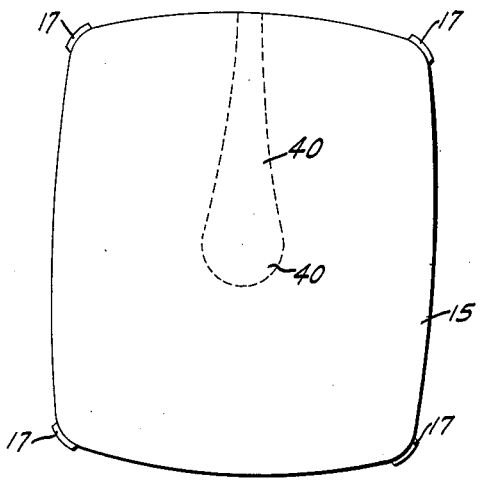
Figure 8:
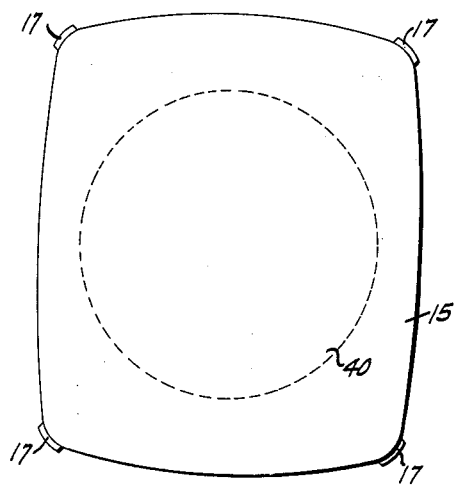
Figure 9:
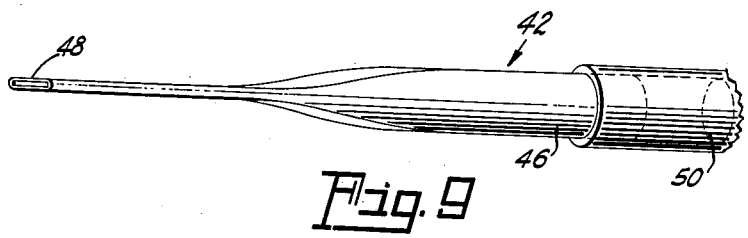

FIG. 3 shows, in representative form, the shield faceplate spacing during heating; and FIG. 4 shows, in representative form, insertion of the fluid bonding medium; and FIG. 5 shows, in representative form, the portion of the lamination surface wet by the bonding medium after the dispensing step; and FIG. 6 shows, in representative form, the final lamination spacing; and FIG. 7 shows a bottom view of FIG. 4; and FIG. 8 shows a bottom view of FIG. 5; and FIG. 9 shows the bonding medium insertion nozzle.

The shield bonding process contemplated here assumes a completed cathode ray tube image display in final form. It is to be noted that a bonded safety shield contributes structural rigidity; therefore, it is not necesasry that the faceplate of the image display be as thick as would normally be the case in a separate image display to be used without a bonded shield.

After the faceplate and shield of the image display have been cleaned with a wetting detergent or some other cleaning material which is known not to interfere with the action of the bonding medium, the faceplate and shield are mounted in clamping structures somewhat as shown in the cross section of FIG. 1.

Referring to FIG. 1, image display 11, having a faceplate portion 13, is placed on a glass shield 15 which includes a plurality of side lugs 17 in turn supported for vertical adjustment by a clamping means generally shown in representative form at 19. After the image display is placed on the shield with the lower convex faceplate surface 21 contacting the upper concave surface 23 of the shield, a spacer structure 25 is placed around the image display 11 so that the seven spacer legs 27 space the sides of the image display 11 away from the sides of the shield 15.

Briefly referring to FIG. 2, it can be seen that the spacer legs 27 are symmetrically placed around three sides of the periphery of the image display with only one spacer leg on side 29. Side 29 will hereinafter be referred to as the dispensing side for reasons to be brought out more clearly.

Though not clearly shown in FIG. 1 or FIG. 2, it is to be noted that allowable variations in the size of the image display and shield structure, i.e., the allowable glass size tolerance range, may be such that the spacer legs 27 do not completely fill the space between the sides of the faceplate and the sides of the shield. In such cases it has been found desirable to hold the spacing set by spacer legs 27 on side 31 and allow any additional spacing which may be available to be added to the spacing on dispensing side 29. In addition, it has been found desirable to intentionally enlarge the spacer leg 27 on dispensing side 29 relative to the other spacer legs. For example, in one embodiment wherein the cathode ray tube image display had a diagonal faceplate measurement of approximately 23 inches the six spacer legs 27 on sides 31, 33 and 35 had a thickness of approximately .095 inch while the spacing leg 27 on dispensing side 29 had a thickness of approximately .115 inch. Thus the spacing on the dispensing side 29 is always larger than the spacing on any other side, having a given minimum spacing, in the example, of .115″ and having a greater spacing whenever the size relationship between the cathode ray tube and shield will allow. Thus it can be said that the vertical axis of symmetry of the safety shield is intentionally placed in parallel spaced relationship with the longitudinal axis of the image display, at least during the dispensing step.

After the spacing between the faceplate and the shield has been adjusted with spacer structure 25, the shield 15 and cathode ray tube 11 are tightly clamped in place relative to each other with clamps 19 and 39, respectively, for horizontal movement along a conveyor. Though the type of conveyor used is not of extreme importance to the process and for this reason has not been shown in the drawings, it is to be understood that the conveyor must be suitable for moving the clamped cathode ray tubes 11 and shields 15 horizontally through the various process stations. It is further to be noted that clamps 39, holding the cathode ray tube 11, are vertically fixed or are capable of being vertically fixed. In all subsequent processing steps wherein the relative spacing between the shield and faceplate of the cathode ray tube must be adjusted, such adjustment is made by changing the position of the shield 15 relative to the cathode ray tube faceplate 13. Thus clamps 19 must be of the type suitable for accurately controlled vertical adjustment.

After the cathode ray tube 11 is firmly clamped in position with clamps 39 and the spacer structure 25 is removed, spacing between the shield 15 and plate 13 is adjusted for the next step which may be either preheating, if preheating is desirable, or dispensing.

Preheating may be desirable in order to shorten the hardening period of the bonding medium. For example when using exothermic reaction type epoxy resins it has been found desirable to preheat the bonding surfaces at least to the resin dispensing temperature. In one particular embodiment, epoxy resin was used which was mixed with hardener and dispensed at a temperature of 200° F. By preheating the faceplate 13 and the shield 15 to 200° F. prior to dispensing the resin, little if any energy of the exothermic reaction was absorbed by the bonding surfaces, and the resultant polymerization period of the resin was minimized. It was then possible to minimize the overall length of the conveyor and the overall process time with a resultant saving in cost.

It is to be noted that some bonding mediums would require no preheating because of a hardening characteristic suitable for use at normal room temperature. Also, the cathode ray tube 11 and shield 15 may already have been brought to a suitable temperature prior to clamping making it possible to go directly from the clamping step to the dispensing step without preheating.

Where preheating is desirable, immediately after the clamping step, shield 15 is moved downward to allow approximately .010 inch to .015 inch spacing between the faceplate surface 21 and the shield surface 23. Such close spacing removes the weight of the cathode ray tube from the shield without subsequent loss of uniformity in heating. Then the complete unit is moved along the conveyor through a furnace or some other heating means and the bonding surfaces are preheated.

After preheating, the shield 15 is again moved vertically downward to a spacing best suited for dispensing of the bonding medium into the shield. Before considering the method of arriving at the best dispensing spacing between the faceplate surface 21 and the shield surface 23, it is best to consider the amount of fluid bonding medium to be dispensed.

The amount of bonding medium used depends upon the size of the cathode ray tube 11 and shield 15 to be bonded and upon the minimum thickness of hardened material which will produce proper lamination. Assuming a manufacturing run of a given size cathode ray tube 11 and shield 15, the amount of fluid bonding medium is determined by selecting that quantity which will at least produce an acceptable minimum thickness of bonding medium in the worst possible combination of faceplate 13 and shield 15 contours which are within the range of manufacturing tolerance. In other words, for a given nominal size of cathode ray tube 11, normal manufacturing tolerance allows a given range of faceplate and shield sizes and contours. Thus one given faceplate and one given shield within these tolerance ranges would require more bonding medium to produce an acceptable minimum lamination thickness than any other possible faceplate-shield combination. It is this quantity which is selected as the amount to be dispensed. The quantity of bonding medium to be dispensed therefore varies from one nominal cathode ray tube size such as an 18 inch tube to the next such as the 23 inch tube. However, for any one given nominal cathode ray tube size, the quantity of bonding medium dispensed remains fixed for the complete run.

Thus the dispensing unit used must be able to dispense the selected amount of bonding medium time after time with reasonable accuracy because in the final analysis the amount of bonding medium dispensed acts as a measure of the final spacing between the faceplate surface 21 and the safety shield surface 23, as will be brought out more clearly hereinafter.

Referring to FIGS. 4 and 5, which best show the dispensing faceplate-shield spacing, it can be seen that the dispensing spacing is greater than the preheat spacing shown in FIG. 3. In one particular embodiment wherein a cathode ray tube having a diagonal screen measurement of approximately 23" was being processed, it was found desirable to drop the safety shield an additional .10 inch over and above the preheat spacing of approximately .01 inch. Basically after the amount of bonding medium to be dispensed has been determined, the dispensing spacing can be set so as to be greater than the final lamination spacing but less than the spacing which allows only minimum wetting of the faceplate surface during the dispensing step. In other words, the dispensing spacing should not be so great that the final quantity of bonding medium after being dispensed into the shield 15 is insufficient to at least touch and wet a portion of the faceplate center surface.

Referring to FIG. 4 it can be seen that the bonding medium 40 is dispensed from a nozzle 42 more completely shown in FIG. 9. Preferably the bonding fluid 40 should be dispensed along the upper edge of shield surface 23 and allowed to flow down toward the center of the safety shield forming a pattern as shown in FIG. 7 when viewed from the bottom. This manner of dispensing the bonding medium helps to eliminate air entrapment by pushing the air ahead of the fluid as the fluid flows into the safety shield 15. Thus the center portion of the faceplate surface 21 is first wet by the bonding medium, and as more of the bonding medium is dispensed the wetted area of the faceplate 21 increases rapidly until all of the bonding medium is dispensed as shown in FIG. 5.

After the dispensing step the safety shield 15 is adjusted vertically upward and clamped into final lamination position. Instead of lifting the shield 15 a given distance, and then making a second and final dispensing fill, as was done in the prior art, and instead of using lamination spacers between the faceplate and safety shield at this point as was also done by the prior art, the operator merely lifts the shield 15 sufficiently to force the fluid bonding medium 40 up against the faceplate throughout the whole lamination surface. Thus as the safety shield 15 is lifted the fluid bonding medium 40 is forced up along the sides of the faceplate until the operator is able to see the upper level of the fluid and stop upward movement of the safety shield when the fluid medium gets approximately 1/8 inch below the upper edge of the shield 15. In other words, by dispensing a given quantity of fluid bonding medium 40 into each shield 15 the lamination spacing can be adjusted merely by raising the shield just shy of overflow of the bonding medium 40. This eliminates any need for other means of measurement. Though the lamination spacing from tube to tube may vary slightly due to variations in faceplate and shield contour, satisfactory adherence is obtained.

After the safety shield 15 is moved into final lamination position the shield 15 is clamped firmly in place and moved along the conveyor until the bonding medium 40 becomes sufficiently hard for handling. With the use of some bonding mediums subsequent heating may be used to shorten the hardening period if desirable. In one specific embodiment the hardening period was approximately 45 minutes without heating.

Basically the process described herein has several important features. Prior art processes intentionaly centered the cathode ray tube over the safety shield making it necessary to use an extremely small dispensing nozzle which lengthened the dispensing period and in some cases resulted in air entrapment. The process described herein intentionally staggers the horizontal axis of the cathode ray tube and the central vertical axis of the safety shield so that additional space is provided on the dispensing side of the shield. Air entrapment is thus minimized. Further, in prior art processes the shield was clamped in position and the cathode ray tube moved vertically in each of the various process steps. This prior art method was found to be extremely unwieldy especially when processing large tubes such as a 23 inch cathode ray tube, and regardless of the clamping and adjusting means used, bonding medium air entrapment seemed to result. Further, by dispensing a given quantity of bonding medium in each and every shield, spacers or other measuring devices are eliminated. The bonding medium level acts to finally determine lamination spacing.

Finally it has been found that the nozzle used in dispensing fluid bonding medium is desirably shaped in accordance with the nozzle shown in FIG. 9. This is especially true when the bonding medium is of the dispenser mixed epoxy resin and hardener type.

Referring to FIG. 9 it can be seen that the nozzle 42 therein comprises a tube 46 which has been flattened at one end 48. The tube diameter should be selected to be of either approximately equal to or slightly smaller in diameter internally than the diameter of the tube 50 feeding the bonding medium from the mixing and dispensing means, not shown. As a result of this nozzle size selection there is no slowing up of the fluid flow through the dispensing nozzle. Nozzles having a greater cross-sectional area than the dispensing tube either at the flattened tip or in the base thereof tend to allow the bonding medium to slow down and build up hardened particles along the inner surfaces of the nozzle. These hardened particles then break loose causing imperfections in the lamination layer and sometimes cause turbulence in the bonding medium flow which results in lamination layer air entrapment.

While there has been shown and described what is at present considered the preferred embodiment of the present invention, it will be obvious to those skilled in the art that various changes and modifications may be made therein without departing from the invention as defined by the appended claims.

Having thus described our invention we claim:

1. In a process for filling the volume between the convex outer surface of a cathode ray tube faceplate and the dish-shaped concave inner surface of a safety shield with a fluid suitable for hardening into a substantially solid light permeable bonding medium, the steps comprising supporting a safety shield with its concave inner surface disposed upwardly and symmetrically around a vertical axis through the center of the shield, supporting a cathode ray tube above the safety shield with the longitudinal axis of the cathode ray tube disposed in parallel spaced relationship with the safety shield vertical axis of symmetry and with the convex cathode ray tube faceplate surface disposed adjacent and in spaced relationship with the concave safety shield surface, whereby the spacing between an edge of the convex faceplate surface and the adjacent edge of the concave safety shield surface is greater on one side of the safety shield than between the opposite edges of the face plate and safety shield, flowing a given quantity of a light permeable hardenable fluid bonding medium down said one side of the concave safety shield surface, said given quantity of fluid bonding medium being sufficient to fill the safety panel above the lowermost level of the convex surface of the cathode ray tube faceplate, moving the faceplate vertically toward the cathode ray tube to force the upper level of the bonding medium to wet the major portion of the convex faceplate surface and to fill the major portion of the volume bounded in part by the convex faceplate surface and the concave safety shield surface, and clamping the safety shield relative to the cathode ray tube for the hardening period of the bonding medium.

2. In a process for filling the volume between the outer convex faceplate surface of a cathode ray tube and the inner concave surface of a safety shield with a fluid suitable for hardening into a substantially solid light permeable bonding medium, the steps comprising supporting a cathode ray tube and a safety shield in closely spaced filling position with the concave surface of the safety shield disposed upwardly and the convex surface of the faceplate disposed downwardly, said spacing being largest near one edge of said safety shield with the overall average spacing being larger than the final desired spacing, flowing a given quantity of light permeable fluid bonding medium of the hardenable type over said one safety shield edge to wet at least the lowermost inner portions of the safety shield and the outer surface of the cathode ray tube faceplate, vertically raising the safety shield to laminating position to completely wet the lamination surfaces of the cathode ray tube faceplate and safety shield without overflow of the bonding medium, and clamping the safety shield relative to the cathode ray tube for the hardening period of the bonding medium.

3. In a process for filling the volume between the outer convex faceplate surface of a cathode ray tube and the inner concave surface of a safety shield with a fluid suitable for hardening into a substantially solid light permeable bonding medium, the steps comprising clamping a cathode ray tube in position over a vertically movable safety shield with the concave inner surface of the safety shield disposed upwardly in fluid retention position and surrounding the convex outer faceplate surface of the cathode ray tube in spaced relationship therewith, flowing a given quantity of fluid bonding medium of hardenable type into the space between the safety shield and the cathode ray tube faceplate, said given quantity of bonding medium wetting only a portion of the faceplate and the safety shield surfaces to be laminated, vertically raising the safety shield to force the upper level of the bonding medium to approximately the upper edge of the safety shield, and clamping the safety shield in position relative to the cathode ray tube during the hardening period of the bonding medium.

4. In a process for filling the volume between the outer convex faceplate surface of a cathode ray tube and the inner concave surface of a safety shield with a fluid suitable for hardening into a substantially solid light permeable bonding medium, the steps comprising clamping a cathode ray tube in position over a vertically movable safety shield with the concave inner surface of the safety shield disposed upwardly in fluid retention position and surrounding the convex outer faceplate surface of the cathode ray tube in closely spaced relationship therewith, heating at least the faceplate surface and the safety shield surface to substantially a given temperature, lowering the safety shield to increase the spacing between the faceplate and the safety shield beyond the desired lamination spacing, flowing a given quantity of given temperature, hardenable fluid bonding medium into the space between the safety shield and the cathode ray tube faceplate, said given quantity of bonding medium wetting only a portion of the faceplate and safety shield surfaces to be laminated, vertically raising the safety shield to force the upper level of the bonding medium to approximately the upper edge of the safety shield, and clamping the safety shield in position relative to the cathode ray tube during the hardening period of the bonding medium.

References Cited in the file of this patent

UNITED STATES PATENTS

| | | |
|---|---|---|
| 1,937,396 | Watkins | Nov. 28, 1933 |
| 2,020,178 | Haas | Nov. 5, 1935 |
| 2,293,529 | Bedford | Aug. 18, 1942 |
| 2,734,142 | Barnes | Feb. 7, 1956 |
| 2,887,424 | Langberg | May 10, 1956 |